United States Patent
Wu et al.

(10) Patent No.: US 12,448,665 B2
(45) Date of Patent: Oct. 21, 2025

(54) HOT-ROLLED STEEL PLATE/STRIP FOR SULFURIC ACID DEW POINT CORROSION RESISTANCE AND MANUFACTURING METHOD THEREFOR

(71) Applicant: BAOSHAN IRON & STEEL CO., LTD., Shanghai (CN)

(72) Inventors: Jianchun Wu, Shanghai (CN); Yuan Fang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 799 days.

(21) Appl. No.: 17/761,697

(22) PCT Filed: Sep. 15, 2020

(86) PCT No.: PCT/CN2020/115291
§ 371 (c)(1),
(2) Date: Mar. 18, 2022

(87) PCT Pub. No.: WO2021/052317
PCT Pub. Date: Mar. 25, 2021

(65) Prior Publication Data
US 2022/0340993 A1   Oct. 27, 2022

(30) Foreign Application Priority Data

Sep. 19, 2019  (CN) .......................... 201910889375.0
Sep. 19, 2019  (CN) .......................... 201910889420.2

(51) Int. Cl.
*C21D 9/52*    (2006.01)
*C21D 6/00*    (2006.01)
(Continued)

(52) U.S. Cl.
CPC ............... *C21D 9/52* (2013.01); *C21D 6/004* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS

2020/0115771 A1* 4/2020 Yokoyama ........... C21D 8/0226
2021/0017620 A1* 1/2021 Yokoyama ........... C21D 8/0263

FOREIGN PATENT DOCUMENTS

CA      2476546 A   1/2004
CN      1753744 A   3/2006
(Continued)

OTHER PUBLICATIONS

International Search Report for PCT/CN2020/115291 dated Dec. 17, 2020.
(Continued)

*Primary Examiner* — Brian D Walck
(74) *Attorney, Agent, or Firm* — Lei Fang, Esq.; Smith Tempel Blaha LLC

(57) ABSTRACT

Disclosed are a hot-rolled steel plate/strip with sulfuric acid dew point corrosion resistance and a method for producing the same, wherein the hot-rolled steel plate/strip comprises the following chemical elements in weight percentages: C: 0.02-0.06%, Si: 0.10-0.55%, Mn: ≤1.5%, P≤0.03%, S≤0.007%, Ti: 0.03-0.15%, Cr: 0.50-1.20%, Ni: 0.10-0.30%, Sb: 0.04-0.30%, Cu: 0.20-0.60%, N: 0.004-0.010%, Als: <0.001%, one or both of Sn: 0.005-0.04% and B: 0.001-0.006%, Mn/S≥250, total oxygen $[O]_T$: 0.007-0.020%; and a balance of Fe and other unavoidable impurities. The steel can be widely applied to the fields of tobacco (Continued)

baking apparatuses, air preheater heat exchange elements in industries such as petroleum, chemical industry, electric power, and metallurgy, delivery pipe, flue, and stack manufacturing structural parts, and boiler preheater and economizer equipment, of which the use environments have requirements for sulfuric acid dew point corrosion resistance performance.

16 Claims, 3 Drawing Sheets

(51) Int. Cl.
    *C21D 8/02*     (2006.01)
    *C22C 38/00*     (2006.01)
    *C22C 38/02*     (2006.01)
    *C22C 38/04*     (2006.01)
    *C22C 38/06*     (2006.01)
    *C22C 38/42*     (2006.01)
    *C22C 38/50*     (2006.01)
    *C22C 38/60*     (2006.01)

(52) U.S. Cl.
    CPC ......... *C21D 8/0205* (2013.01); *C21D 8/0226* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/50* (2013.01); *C22C 38/60* (2013.01); *C21D 2211/005* (2013.01); *C21D 2211/009* (2013.01)

(56) References Cited

FOREIGN PATENT DOCUMENTS

| | | | | |
|---|---|---|---|---|
| CN | 101736202 | A | 6/2010 | |
| CN | 101827668 | A | 9/2010 | |
| CN | 102787278 | A | 11/2012 | |
| CN | 102787280 | A | 11/2012 | |
| CN | 102796943 | A | 11/2012 | |
| CN | 102796969 | A | 11/2012 | |
| CN | 104451457 | A | 3/2015 | |
| CN | 105088073 | A | 11/2015 | |
| CN | 105937010 | A | 9/2016 | |
| CN | 106414784 | A | 2/2017 | |
| CN | 109628841 | A | 4/2019 | |
| EP | 0284694 | A2 * | 10/1988 | |
| JP | 6418367 | B1 * | 11/2018 | ........... B32B 15/013 |
| WO | WO-02103073 | A2 * | 12/2002 | ............. C21D 1/673 |
| WO | WO-2018193787 | A1 * | 10/2018 | ............. C21D 6/002 |

OTHER PUBLICATIONS

International Written Opinion for PCT/CN2020/115291 dated Dec. 17, 2020.

* cited by examiner

HOT-ROLLED STEEL PLATE/STRIP FOR SULFURIC ACID DEW POINT CORROSION RESISTANCE AND MANUFACTURING METHOD THEREFOR

CROSS-REFERENCE TO RELATED APPLICATIONS

This application is a 371 U.S. National Phase of PCT International Application No. PCT/CN2020/115291 filed on Sep. 15, 2020, which claims benefit and priority to Chinese patent application No. CN 201910889375.0 filed on Sep. 19, 2019 and Chinese patent application No. CN 201910889420.2 filed on Sep. 19, 2019, the contents of each of the above listed applications are incorporated by reference herein in their entiries.

TECHNICAL FIELD

The present disclosure relates to a continuous casting process of metallurgical industry, in particular to a hot-rolled steel plate/strip with sulfuric acid dew point corrosion resistance and a manufacturing method therefor.

BACKGROUND ART

In recent years, due to the continuous recycling of scrap steel, there are more and more scrap steel resources, and the price of electricity has continued to decrease. Short-flow electric furnace steelmaking based on scrap steel is increasingly emerging in China, resulting in a gradual increase in the content of residual elements such as Sn and Cu in steel. Sn and Cu in steel are easy-to-segregate elements, which are easy to accumulate at grain boundaries and cause defects such as cracks. Therefore, the content of Sn and Cu elements is strictly controlled in the traditional process. In steels for common structures, there are explicit requirements for both Sn content and Cu content: Sn (wt %)≤0.005%; Cu (wt %)≤0.2%.

In the traditional steelmaking process, tin (Sn) and copper (Cu) are typical residual elements or harmful elements in steel. It is very difficult and expensive to fully remove Sn and Cu during the steelmaking process. Once the steel comprises Sn, Cu, basically, they cannot be completely removed, and the content of Sn, Cu can only be reduced by diluting molten steel, which leads to the increase of the smelting cost of iron and steel products.

Therefore, if the residual elements such as Sn and Cu in steel (especially scrap steel) can be reasonably utilized and "turn harm into benefit", it will have a positive impact on the entire metallurgical industry, achieve effective utilization of existing scrap steel or low-quality inferior mineral resources (high tin ores, high copper ores), promote the recycling of steel, reduce production costs, and achieve sustainable development of the steel industry.

Traditional thin strip steel is mostly produced by multi-pass continuous rolling of a cast slab having a thickness of 70-200 mm. The traditional hot rolling process is: continuous casting+cast slab reheating and heat preservation+rough rolling+finish rolling+cooling+coiling. Particularly, a cast slab having a thickness of about 200 mm is firstly obtained by continuous casting; the cast slab is reheated and held; then, rough rolling and finish rolling are performed to obtain a steel strip having a thickness generally greater than 2 mm; and finally, laminar cooling and coiling are performed on the steel strip to complete the entire hot rolling production process. If a steel strip having a thickness of less than or equal to 1.5 mm is to be produced, it is relatively difficult, because subsequent cold rolling and annealing of the hot-rolled steel strip are generally necessary. In addition, the long process flow, the high energy consumption, the large number of unit devices, and the high capital construction cost result in high production cost.

The thin slab continuous casting and rolling process flow is: continuous casting+heat preservation and soaking of the cast slab+hot continuous rolling+cooling+coiling. The main differences between this process and the traditional process are as follows: the thickness of the cast slab in the thin slab process is greatly reduced to 50-90 mm Because the cast slab is thin, the cast slab only needs to undergo 1-2 passes of rough rolling (when the thickness of the cast slab is 70-90 mm), or does not need to undergo rough rolling (when the thickness of the slab is 50 mm). In contrast, the continuous casting slab in the traditional process needs to be rolled repeatedly for multiple passes before it can be thinned to the required gauge before finish rolling. In addition, the cast slab in the thin slab process does not undergo cooling, but enters a soaking furnace directly for soaking and heat preservation, or a small amount of heat is supplemented. Hence, the thin slab process greatly shortens the process flow, reduces energy consumption, reduces investment, and thus reduces production cost. However, due to the fast cooling rate, the thin slab continuous casting and rolling process increases the steel strength and yield ratio, thereby increasing the rolling load, so that the thickness gauge of the hot-rolled products that can be economically produced cannot be too thin, generally ≥1.5 mm See Chinese patents CN200610123458.1, CN200610035800.2 and CN200710031548.2, none of which mentions Sn or Cu.

The endless thin slab continuous casting and rolling process (ESP in short) rising in recent years is an improved process developed on the basis of the above semi-endless thin slab continuous casting and rolling process. The ESP realizes endless rolling for continuous casting of a slab, and eliminates the flame cutting of the slab and the heating furnace that is used for heat preservation, soaking and transition of slabs. The length of the entire production line is greatly shortened to about 190 meters. The slab produced by continuous casting with a continuous casting machine has a thickness of 90-110 mm and a width of 1100-1600 mm. The slab produced by continuous casting passes through an induction heating roll table to effect heat preservation and soaking on the slab. Then, the slab enters the rough rolling, finish rolling, laminar cooling, and coiling processes to obtain a hot-rolled plate. Since this process realizes endless rolling, a hot-rolled plate having a minimum thickness of 0.8 mm can be obtained, which expands the range of the gauge of hot-rolled plates. In addition, the output of a single production line can reach 2.2 million t/year. At present, this process has been developed and promoted rapidly, and there is a plurality of ESP production lines in operation around the world.

The thin strip continuous casting and rolling process has a shorter process flow than the thin slab continuous casting and rolling process. The thin strip continuous casting technology is a cutting-edge technology in the research field of metallurgy and materials. Its appearance brings about a revolution to the steel industry. It changes the production process of steel strip in the traditional metallurgical industry by integrating continuous casting, rolling, and even heat treatment, so that the thin strip blank produced can be formed into a thin steel strip at one time after one pass of online hot rolling. Thus, the production process is simplified greatly, the production cycle is shortened, and the length of the process line is only about 50 m. The equipment investment is also reduced accordingly, and the product cost is significantly reduced. It is a low-carbon, environmentally friendly process for producing a hot-rolled thin strip. The twin-roll thin strip continuous casting process is the main form of the thin strip continuous casting process, and it is also the only thin strip continuous casting process that has been industrialized in the world.

A typical process flow of twin-roll thin strip continuous casting is shown by FIG. 1. The molten steel in the ladle 1 passes through a ladle shroud 2, a tundish 3, a submerged nozzle 4 and a distributor 5, and is then directly poured into a molten pool 7 formed with side sealing plate devices 6a, 6b and two counter-rotating crystallization rolls 8a, 8b capable of rapid cooling. The molten steel solidifies on the circumferential surfaces of the rotating crystallization rolls 8a, 8b to form a solidified shell which gradually grows, and then forms a 1-5 mm thick steel strip 11 at the minimum gap (nip point) between the two crystallization rolls. The steel strip is guided by a guide plate 9 to pinch rolls 12 and sent to a rolling mill 13 to be rolled into a thin strip of 0.7-2.5 mm, and then cooled by a cooling device 14. After its head is cut off by a flying shear 16, it is finally sent to a coiler 19 to be coiled into a coil.

The thin-gauge hot-rolled steel plate/strip product with sulfuric acid dew point corrosion resistance can be widely used in tobacco baking equipment, heat exchange elements of air preheaters in petroleum, chemical industry, electric power, metallurgy and other industries, conveying pipes and flues, stack manufacturing structural parts, boiler preheaters and economizer equipment and other product fields that require sulfuric acid dew point corrosion resistance in their use environment. A high sulfur content in the fuel is usually common in these fields, and the formation of sulfuric acid at the dew point temperature causes equipment corrosion problems, which is called "sulfuric acid dew point corrosion" phenomenon. Boiler flue gas with relatively high sulfur content fuel contains $SO_2$ and $SO_3$, which combine with water vapor in the flue gas to generate sulfurous acid and sulfuric acid, which condense on the low-temperature parts of the boiler, causing sulfuric acid dew point corrosion. Therefore, it is required for this type of steel that when the steel contacts with sulfur gas (such as sulfur-containing waste gas discharged from steel stacks, tobacco baking heat exchangers, etc.), the corrosion resistance to sulfurous acid or sulfuric acid generated by the combination of $SO_3$, $SO_2$ and $H_2O$ below the dew point should be increased. The components in the above fields made of ordinary carbon steel have poor resistance to sulfuric acid dew point corrosion, severe corrosion and short service life. If acid-resistant stainless steel is used to make these parts, the material price is very expensive, and the construction cost will be greatly increased. Therefore, the production of the thin-gauge hot-rolled steel plate/strip product with sulfuric acid dew point corrosion resistance by thin strip continuous casting process proposed by the present disclosure has certain manufacturing and cost advantages. The successful development of the thin-gauge hot-rolled steel plate/strip product with sulfuric acid dew point corrosion resistance will provide broad prospects for the above industries in terms of green environmental protection, cost reduction and efficiency enhancement, etc.

The hot-rolled steel plate/strip product with sulfuric acid dew point corrosion resistance manufactured by thin strip continuous casting technology has strong manufacturing and cost advantages due to its thin thickness. The thin-gauge hot-rolled steel plate/strip product with sulfuric acid dew point corrosion resistance has a characteristic thickness in the range of 1.2-2.0 mm Due to its thin thickness, it is difficult to produce the product by traditional continuous casting+continuous hot rolling production lines, especially for hot-rolled steel plate products having a thickness of ≤1.5 mm, which basically cannot be satisfied by the traditional hot rolling production lines. Even if thin slab continuous casting and rolling is used, the roll consumption is relatively great, which increases the production cost of the thin-gauge hot-rolled steel plate/strip product with sulfuric acid dew point corrosion resistance.

When hot-rolled strip steel is used as a thin-gauge hot-rolled plate or a hot-rolled product in place of a cold-rolled product, high surface quality of the strip steel is required. It is generally required that the thickness of the oxide scale on the surface of strip steel should be as thin as possible. This requires control of the formation of the oxide scale on the cast strip in the subsequent stages. For example, in a typical twin-roll continuous casting process for thin strip steel, a closed chamber device is used from the crystallization rolls to the inlet of the rolling mill to prevent oxidation of the cast strip. Addition of hydrogen to the closed chamber device as disclosed in U.S. Pat. No. 6,920,912 and control of the oxygen content to be less than 5% in the closed chamber device as disclosed in US Patent Application US20060182989 can both help to control the thickness of the oxide scale on the cast strip surface. However, there are few patents related to how to control the thickness of the oxide scale in the conveying process from the rolling mill to the coiler, especially in the process of cooling the strip steel by laminar cooling or spray cooling. When the high-temperature strip steel is in contact with the cooling water, the thickness of the oxide scale on the surface of the cast strip grows rapidly. At the same time, the contact of the high-temperature strip steel with the cooling water may also cause many problems: first, water spots (rust spots) may be formed on the surface of the strip steel, which will affect the surface quality; second, cooling water for laminar cooling or spray cooling tends to cause local uneven cooling on the surface of the strip steel, resulting in a nonuniform microstructure inside the strip steel, so that the properties of the strip steel are not uniform and the product quality is affected; third, the local uneven cooling on the surface of the strip steel may cause deterioration of the strip shape, which affects the shape quality.

Chinese Patent Application CN200610123458.1 discloses a method of producing 700 MPa grade high-strength and corrosion-resistant steel using a Ti micro-alloying process based on a thin slab continuous casting and rolling process flow. The chemical composition of the corrosion-resistant steel plate manufactured by this method comprises: C: 0.03-0.07%, Si: 0.3-0.5%, Mn: 1.2-1.5, P: ≤0.04%, S≤0.008%, Al: 0.025-0.05%, Cr: 0.3-0.7%, Ni: 0.15-0.35%, Cu: 0.2-0.5%, Ti: 0.08-0.14%, N: ≤0.008%, and a balance of Fe and unavoidable impurities. The steel plate has a yield strength of ≥700 MPa, a tensile strength of ≥775 MPa, and an elongation of ≥21%. In this patent application, phosphorus is controlled as an impurity element, and the content is ≤0.04%, which is enlarged as compared with ≤0.025% in the traditional process.

Chinese Patent Application CN200610035800.2 discloses a method of producing 700 MPa grade V-N micro-alloyed corrosion-resistant steel based on a thin slab continuous casting and rolling process. The chemical composition of the corrosion-resistant steel plate manufactured by this method comprises: C: ≤0.08%, Si: 0.25-0.75%, Mn: 0.8-2, P: ≤0.07-0.15%, S: ≤0.04%, Cr: 0.3-1.25%, Ni: ≤0.65%, Cu: 0.25-

0.6%, V: 0.05-0.2%, N: 0.015-0.03%, and a balance of Fe and unavoidable impurities. The steel plate has a yield strength of ≥700 MPa, a tensile strength of ≥785 MPa, and an elongation of ≥21%. In this patent application, phosphorus is controlled as an element that improves corrosion resistance, and the content is 0.07-0.15%. The content of copper is 0.25-0.6%, wherein its lower limit and upper limit are higher than the lower limit of 0.2% and the upper limit of 0.55% of the copper content respectively in the traditional process.

Chinese Patent Application CN1633509A mentions a method of producing a copper-containing carbon steel product by thin strip continuous casting. This patent application emphasizes that this strip steel should be subjected to heat treatments such as annealing, tempering and the like in the temperature range of 400-700° C. to allow for precipitation or recrystallization of copper element in the strip steel. The method of manufacturing a high-copper, low-alloy thin strip mentioned in Patent US2008264525/CN200580009354.1 is characterized in that the strip steel is cooled to below 1080° C. in a non-oxidizing atmosphere before entering a rolling mill in order to prevent the "hot shortness" phenomenon of the strip steel.

The above-mentioned patents all relate to the corrosion resistance of steel, but none of the contents relate to the effect of sulfuric acid dew point corrosion resistance. The present disclosure relates to a type of steel specially proposed for sulfuric acid dew point corrosion resistance.

SUMMARY

One object of the present disclosure is to provide a hot-rolled steel plate/strip with sulfuric acid dew point corrosion resistance and a manufacturing method therefor. The thin strip continuous casting process is used to produce a thin-gauge hot-rolled steel plate/strip product with sulfuric acid dew point corrosion resistance, which has certain advantages in terms of manufacturing and cost, and can be widely used in tobacco baking equipment, heat exchange elements of air preheaters in petroleum, chemical industry, electric power, metallurgy and other industries, conveying pipes and flues, stack manufacturing structural parts, boiler preheaters and economizer equipment and other product fields that require sulfuric acid dew point corrosion resistance in their use environment.

To achieve the above object, the technical solution of the present disclosure is as follows:

According to the present disclosure, residual elements such as Sn and Cu in scrap steel are used to smelt molten steel, and micro-alloy elements such as Cr, Ti, Sb and the like are selectively added to the steel, or B element is added in the absence of Sn. In the smelting process, the basicity of the slag, the type and melting point of the inclusions in the steel, the free oxygen content in the molten steel, and the content of acid-soluble aluminum Als are controlled. Then, twin-roll thin strip continuous casting is performed to cast a strip steel having a thickness of 1.5-3 mm After the strip steel exits from the crystallization rolls, it directly enters a lower closed chamber having a non-oxidizing atmosphere, and enters an on-line rolling mill for hot rolling under closed conditions. The rolled strip steel is cooled by gas atomization cooling. Finally, the strip steel is coiled.

Particularly, the hot-rolled steel plate/strip with sulfuric acid dew point corrosion resistance according to the present disclosure comprises the following chemical elements in weight percentages: C: 0.02-0.06%, Si: 0.10-0.55%, Mn: ≤1.5%, P≤0.03%, S≤0.007%, Ti: 0.03-0.15%, Cr: 0.50-1.20%, Ni: 0.10-0.30%, Sb: 0.04-0.30%, Cu: 0.20-0.60%, N: 0.004-0.010%, Als: <0.001%, one or both of Sn: 0.005-0.04% and B: 0.001-0.006%, Mn/S≥250, total oxygen $[O]_T$: 0.007-0.020%; and a balance of Fe and other unavoidable impurities.

Preferably, the content of Mn is 0.4-1.5%.

In some embodiments, the hot-rolled steel plate/strip with sulfuric acid dew point corrosion resistance according to the present disclosure comprises Sn, and it comprises the following chemical elements in weight percentages: C: 0.02-0.06%, Si: 0.10-0.55%, Mn: ≤1.5%, P≤0.03%, S≤0.007%, Ti: 0.03-0.15%, Cr: 0.50-1.20%, Ni: 0.10-0.30%, Sb: 0.04-0.30%, Cu: 0.20-0.60%, N: 0.004-0.010%, Als: <0.001%, Sn: 0.005-0.04%, Mn/S>250, total oxygen $[O]_T$ content: 0.007-0.020%; and a balance of Fe and other unavoidable impurities. In some other embodiments, the hot-rolled steel plate/strip with sulfuric acid dew point corrosion resistance according to the present disclosure comprises B, and it comprises the following chemical elements in weight percentages: C: 0.02-0.06%, Si: 0.10-0.55%, Mn: ≤1.5%, P≤0.03%, S≤0.007%, Ti: 0.03-0.15%, Cr: 0.50-1.20%, Ni: 0.10-0.30%, Sb: 0.04-0.30%, Cu: 0.20-0.60%, N: 0.004-0.010%, Als: <0.001%, B: 0.001-0.006%, Mn/S>250, total oxygen $[O]_T$: 0.007-0.020%; and a balance of Fe and other unavoidable impurities.

In some embodiments, the hot-rolled steel plate/strip with sulfuric acid dew point corrosion resistance according to the present disclosure comprises Sn, and it comprises the following chemical elements in weight percentages: C: 0.02-0.06%, Si: 0.10-0.55%, Mn: 0.4-1.5%, P≤0.03%, S≤0.007%, Ti: 0.03-0.15%, Cr: 0.50-1.20%, Ni: 0.10-0.30%, Sb: 0.04-0.30%, Cu: 0.20-0.60%, N: 0.004-0.010%, Als: <0.001%, Sn: 0.005-0.04%, Mn/S>250, total oxygen $[O]_T$: 0.007-0.020%; and a balance of Fe and other unavoidable impurities. Alternatively, the hot-rolled steel plate/strip with sulfuric acid dew point corrosion resistance according to the present disclosure comprises B, and it comprises the following chemical elements in weight percentages: C: 0.02-0.06%, Si: 0.10-0.55%, Mn: 0.4-1.5%, P≤0.03%, S≤0.007%, Ti: 0.03-0.15%, Cr: 0.50-1.20%, Ni: 0.10-0.30%, Sb: 0.04-0.30%, Cu: 0.20-0.60%, N: 0.004-0.010%, Als: <0.001%, B: 0.001-0.006%, Mn/S>250, total oxygen $[O]_T$: 0.007-0.020%; and a balance of Fe and other unavoidable impurities.

Preferably, in the hot-rolled steel plate/strip with sulfuric acid dew point corrosion resistance according to the present disclosure, Mn/S>250.

The hot-rolled steel plate/strip with sulfuric acid dew point corrosion resistance according to the present disclosure has a microstructure of acicular ferrite+pearlite mixed microstructure.

The hot-rolled steel plate/strip with sulfuric acid dew point corrosion resistance according to the present disclosure has a yield strength of ≥330 MPa, a tensile strength of ≥440 MPa, an elongation of ≥22%. In some embodiments, the hot-rolled steel plate/strip with sulfuric acid dew point corrosion resistance according to the present disclosure has a yield strength of 330-370 MPa, a tensile strength of 440-480 MPa, an elongation of 22-30%.

In some embodiments, the hot-rolled steel plate/strip with sulfuric acid dew point corrosion resistance according to the present disclosure has a thickness of 0.8-2.5 mm, preferably 1.2-2.0 mm.

In some embodiments, the hot-rolled steel plate/strip with sulfuric acid dew point corrosion resistance according to the present disclosure has a relative corrosion rate of ≤10% tested at 30° C., 20% concentrated sulfuric acid for 24 hours, and/or a relative corrosion rate of ≤25% tested at 70° C., 50% concentrated sulfuric acid for 24 hours.

In the chemical composition design of the hot-rolled steel plate/strip with sulfuric acid dew point corrosion resistance according to the present disclosure:

C: C is the most economical and basic strengthening element in the steel. It increases the steel strength by solid solution strengthening and precipitation strengthening. C is an essential element for precipitation of cementite during austenite transformation. Hence, the level of C content largely determines the strength level of the steel. That is, a higher C content leads to a higher strength level. However, since the interstitial solid solution and precipitation of C do great harm to the plasticity and toughness of the steel, and an unduly high C content is unfavorable to the welding performance, the C content cannot be too high. The steel strength is compensated by appropriate addition of an alloy element(s). At the same time, for conventional slab continuous casting, casting in the peritectic reaction zone is prone to produce cracks in the surface of the cast slab, and breakout accidents may occur in severe cases. The same is true for thin strip continuous casting, i.e. casting in the peritectic reaction zone is prone to produce cracks in the surface of the cast strip blank, and the strip will be broken in severe cases. Therefore, the thin strip continuous casting of Fe—C alloy also needs to circumvent the peritectic reaction zone. Hence, the content of C used according to the present disclosure is in the range of 0.02-0.06%.

Si: Si plays a role in solid solution strengthening in the steel, and the addition of Si to the steel can improve steel purity and fulfill deoxygenation. However, an unduly high content of Si will deteriorate weldability and toughness of the welding heat affected zone. Hence, the content of Si used according to the present disclosure is in the range of 0.10-0.55%.

Mn: Mn is one of the cheapest alloy elements. It can improve the hardenability of the steel. It has a considerable solid solubility in the steel, and increases the steel strength by solid solution strengthening with substantially no damage to the plasticity or toughness of the steel. It is the most important strengthening element to improve the steel strength, and it can also play a role in deoxygenation in the steel. However, an unduly high content of Mn will deteriorate weldability and toughness of the welding heat affected zone. Hence, the content of Mn used according to the present disclosure is ≤1.5%. In some embodiments, the content of Mn is in the range of 0.4-1.5%.

P: If the content of P is high, it is prone to segregate at the grain boundary, so that the cold brittleness of the steel will be increased, thereby worsening the weldability, and the plasticity of the steel will be decreased, thereby worsening the cold bendability. In the thin strip continuous casting process, the solidification and cooling rate of the cast strip is extremely fast, and thus the segregation of P can be suppressed effectively. As a result, the disadvantages of P can be avoided effectively, and full use of the advantages of P can be made. Therefore, according to the present disclosure, the P content is higher than that used in the traditional production process, and the limitation to the content of P element is relaxed appropriately. The dephosphorization process is eliminated from the steelmaking process. In the practical operation, it's not necessary to perform the dephosphorization process or add phosphorus intentionally, and the content of P is in the range ≤0.03%.

S: Generally, S is a harmful element in the steel. Particularly, it introduces hot shortness to the steel, reduces the ductility and toughness of the steel, and causes cracks during rolling. S also reduces weldability and corrosion resistance. Therefore, according to the present disclosure, S is also controlled as an impurity element, and its content is in the range of ≤0.007%. In some embodiments, the S content is ≤0.006%. In addition, Mn/S≥250. In some embodiments, Mn/S>250.

Als: In order to curb the inclusions in the steel, Al cannot be used for deoxygenation as required by the present disclosure. In the use of refractories, additional introduction of Al should also be avoided as far as possible, and the content of acid-soluble aluminum Als should be strictly controlled: <0.001%.

N: Similar to C element, N element can improve the steel strength by interstitial solid solution. However, the interstitial solid solution of N harms the plasticity and toughness of the steel to a relatively large extent, and the existence of free N may increase the yield ratio of the steel. Hence, the N content should not be too high. In addition, in the case of adding B, the present disclosure uses the action of N in the steel and B to generate a BN precipitation phase, which requires a certain content of N in the steel. Therefore, the content of N used according to the present disclosure is in the range of 0.004-0.010%.

Cr: Cr is not only an element that improves the hardenability of steel, but also can significantly improve the oxidation resistance of steel, increase the corrosion resistance of steel, and improve the strength and wear resistance of steel, and can also improve the resistance to sulfuric acid at high temperature (>200° C.). However, if its content is too high, the weldability will be deteriorated seriously. According to the present disclosure, the content of Cr is limited to 0.5-1.2%.

Ni: Ni can increase hardenability, and improve the low temperature performance of steel significantly. It is a favorable element for improving the corrosion resistance and obdurability of the steel. At the same time, Ni can counteract the adverse influence of Cr on weldability, and Ni can also prevent the hot shortness of Cu effectively. According to the present disclosure, the content of Ni is limited to 0.1-0.3%.

Ti: Ti can densify the internal structure of steel, reduce failure sensitivity and cold brittleness, and improve weldability. Adding an appropriate amount of Ti to the steel is conducive to resisting sulfuric acid corrosion under high temperature and high concentration environment, and has good resistance to intergranular corrosion. At the same time, Ti has a strong affinity with N and C in steel, and can form carbides and nitrides to improve the strength and plasticity of steel. The content of Nb designed according to the present disclosure is in the range of 0.03-0.15%.

Sb: It is the main additive element in sulfuric acid dew point corrosion resistant steel. It combines with Cu, Cr, Ti and other elements to increase the resistance of steel to sulfuric acid corrosion formed by $SO_3$ and $H_2O$, below the dew point, when the steel is contacted with sulfur gas, such as sulfur-containing waste gas emitted by a steel stack. Since Sb is an easy-to-segregate element, the content of Sb is strictly controlled when producing sulfuric acid dew point corrosion-resistant steel in the traditional process. The present disclosure uses the rapid solidification effect of thin strip continuous casting to increase the upper limit of Sb to 0.30%. The content of Sb designed according to the present disclosure is in the range of 0.04-0.30%.

Cu: Cu in the steel mainly plays a role in solid solution strengthening and precipitation strengthening. At the same time, in the corrosion process of urban industrial atmosphere and sulfuric acid, Cu may be mainly enriched in the rust layer close to the uncorroded surface of the steel. During the corrosion process of industrial atmosphere and sulfuric acid, a protective film of $Cu_2S$ may be formed to block reaction between an anode and a cathode, thereby improving the resistance of the steel to dew point corrosion of atmosphere and sulfuric acid. Since Cu is an element prone to segregation, the content of Cu is generally strictly controlled in the traditional process. In view of the rapid solidification effect of thin strip continuous casting, the upper limit of Cu is increased to 0.60% according to the present disclosure. In a certain sense, the increased Cu content can realize effective utilization of copper in steel scrap or inferior mineral resources (high-copper ore), promote the recycling of steel, reduce production cost, and achieve the purpose of sustainable development. The content of Cu designed according to the present disclosure is in the range of 0.20-0.60%.

Sn: Sn element is also one of the main residual elements in steel scrap. It is recognized as a harmful element in steel. Because Sn is an element prone to segregation, Sn even in a small amount may be enriched at the grain boundary, resulting in defects such as cracks. Therefore, the content of Sn element is strictly controlled in the traditional process. Because thin strip continuous casting has the characteristic of rapid solidification, interdendritic segregation of an element is greatly reduced. As a result, the solid solubility of the element can be increased greatly. Therefore, under the conditions of the thin strip continuous casting process, the content range of Sn element can be expanded, and the steelmaking cost can thus be reduced greatly. FIG. 2 shows the relationship between Sn element and average heat flux. It can be seen from FIG. 2 that when the amount of Sn added is less than 0.04%, there is little influence on the heat flux. That is, there is no influence on the solidification process of the thin strip. FIG. 3 shows the relationship between Sn content and surface roughness. Because cracks on the surface of a cast strip are usually generated at the uneven folds on the surface of the cast strip, surface roughness is used to characterize the occurrence of the surface cracks. If the roughness is large, the probability of cracking is high. It can be seen from FIG. 3 that the increase of the Sn content has no adverse influence on the surface quality of the cast strip under the condition of rapid solidification. As it can be seen from the results in FIGS. 2 and 3, Sn has no adverse influence on the solidification and surface quality of the cast strip. Therefore, according to the present disclosure, the limitation to the Sn content may be further relaxed, and the designed Sn content is in the range of 0.005-0.04%.

B: The notable role of B in the steel is that a minute amount of boron can multiply the hardenability of the steel. B may allow for preferential precipitation of coarse BN particles in high-temperature austenite, thereby inhibiting precipitation of fine AlN, weakening the pinning effect of the fine AlN on grain boundaries, and promoting the growth ability of grains. Hence, austenite grains are coarsened and homogenized. This is beneficial to recrystallization after rolling. The coarsening and homogenization of austenite grains further helps to improve the yield ratio of the product and improve the formability of the product. In addition, the combination of B and N can effectively prevent appearance of the low melting point phase $B_2O_3$ at the grain boundary.

B is an active element that is prone to segregation, and it tends to segregate at the grain boundary. When B-containing steel is produced by the traditional process, the B content is generally controlled very strictly, usually around 0.001-0.003%. In the thin strip continuous casting process, the solidification and cooling rate is fast. Hence, the segregation of B can be inhibited effectively, and more B can be solid dissolved. Therefore, the limitation to the B content can be relaxed appropriately. Coarse BN particles can also be produced by controlling the process appropriately to inhibit precipitation of fine AlN. In this way, B plays a role in nitrogen fixation. As shown by other studies, when B is added in combination with Ti and Cr, better effects can be achieved. Particularly, the possibility of segregation of C atoms may be decreased, and the precipitation of $Fe_{23}(C,B)_6$ at the grain boundary may be avoided. Hence, it is possible to add more B. Therefore, according to the present disclosure, when B is added, a higher B content is used than the traditional process, and the range is 0.001-0.006%. A manufacturing method for the hot-rolled steel plate/strip with sulfuric acid dew point corrosion resistance according to the present disclosure comprises the following steps:

1) Smelting
    wherein smelting is performed on the above composition; wherein a basicity $a=CaO/SiO_2$ (mass ratio) for slagging in a steelmaking process is controlled at $a<1.5$, preferably $a<1.2$, or $a=0.7-1.0$; wherein a $MnO/SiO_2$ ratio (mass ratio) in a low-melting-point $MnO-SiO_2-Al_2O_3$ ternary inclusion produced from molten steel is controlled at 0.5-2, preferably 1-1.8; wherein a free oxygen content $[O]_{Free}$ in the molten steel is 0.0005-0.005%; and wherein in the molten steel, $Mn/S \geq 250$;

2) Continuous casting
    wherein twin-roll thin strip continuous casting is used, wherein a 1.5-3 mm thick cast strip is formed at the smallest gap between two crystallization rolls; wherein the crystallization rolls have a diameter of 500-1500 mm, preferably 800 mm, wherein water is supplied to an inside of the crystallization rolls for cooling; wherein a casting machine has a casting speed of 60-150 m/min; wherein a two-stage system for dispensing and distributing molten steel is used for molten steel delivery in the continuous casting, i.e., a tundish+a distributor;

3) Lower closed chamber protection
    wherein after a cast strip exits from the crystallization rolls, the cast strip has a temperature of 1420-1480° C., and it enters a lower closed chamber directly, wherein a non-oxidizing gas is supplied to the lower closed chamber, wherein an oxygen concentration in the lower closed chamber is controlled at <5%; and wherein the cast strip has a temperature of 1150-1300° C. at an outlet of the lower closed chamber;

4) On-line hot rolling
    wherein the cast strip is delivered through pinch rolls in the lower closed chamber to a rolling mill, and rolled into a rolled steel strip having a thickness of 0.8-2.5 mm at a rolling temperature of 1100-1250° C. and a hot rolling reduction rate controlled at 10-50%, preferably 30-50%, wherein the steel strip after the hot rolling has a thickness of 0.8-2.5 mm, preferably 1.2-2.0 mm;

5) Post-rolling cooling
    wherein the steel strip after the on-line hot rolling is post-rolling cooled, wherein cooling is done by gas atomization cooling, wherein a cooling rate of the gas atomization cooling is 20-100° C./s; and 6) Coiling
    wherein the hot-rolled steel strip is coiled directly into a steel coil after the cooling, wherein a coiling temperature is 600-700° C.

Further, the method also comprises step 7): follow-up treatment, wherein the steel coil is pickled, trimmed and flattened, and then used as a pickled-flattened coil, or the steel coil is trimmed and flattened, and then used as a finished coil.

Preferably, in step 1), electric furnace steelmaking or converter steelmaking may be employed for the smelting to obtain molten steel. Then, the molten steel enters an LF furnace, a VD/VOD furnace, or an RH furnace.

In some embodiments, the raw material of the present disclosure may come from steel scrap. Electric furnace steelmaking or converter steelmaking may be employed for the smelting to obtain molten steel. Then, the molten steel enters a necessary refining process, such as an LF furnace, a VD/VOD furnace, an RH furnace, etc.

Preferably, in step 1), an electric furnace is used for smelting to produce molten steel, wherein 100% steel scrap may be selected as the raw material for smelting without pre-screening. Alternatively, a converter is used for smelting to produce molten steel, wherein steel scrap is added to the converter in an amount of 20% or more based on the raw material for smelting without pre-screening. Then, the molten steel is delivered to an LF furnace, VD/VOD furnace or RH furnace for refining.

Preferably, in step 3), the non-oxidizing gas includes $N_2$, Ar, or $CO_2$ gas produced by sublimation of dry ice.

Preferably, in step 5), the gas atomization cooling utilizes a gas-water flow ratio of 15:1-10:1, a gas pressure of 0.5-0.8 MPa, and a water pressure of 1.0-1.5 MPa. As used herein, the gas-water flow ratio refers to the flow ratio of compressed air to water, and the unit of the flow is $m^3/h$.

Preferably, in step 6), the coiling utilizes double-coiler coiling or Carrousel coiling.

Preferably, in step 6), the hot-rolled and cooled steel strip is directly coiled into a coil after a poor-quality head portion of the steel strip is cut off, and the coiling temperature is 600-700° C.

In a preferred embodiment, the steel of the present disclosure comprises Sn. In step 1), an electric furnace is used for smelting to produce molten steel, wherein 100% steel scrap may be selected as the raw material for smelting without pre-screening. Alternatively, a converter is used for smelting to produce molten steel, wherein steel scrap is added to the converter in an amount of 20% or more based on the raw material for smelting without pre-screening. Then, the molten steel is delivered to an LF furnace, VD/VOD furnace or RH furnace for refining.

In the manufacturing method according to the present disclosure:

In order to improve the castability of the molten steel for thin strip continuous casting, the basicity a=$CaO/SiO_2$ for slagging in the steelmaking process is controlled at a<1.5, preferably a<1.2, or a=0.7-1.0.

In order to improve the castability of the molten steel for thin strip continuous casting, it is necessary to obtain a low-melting-point MnO—$SiO_2$—$Al_2O_3$ ternary inclusion, as shown in the shaded area in FIG. 4. The MnO/$SiO_2$ in the MnO—$SiO_2$—$Al_2O_3$ ternary inclusion is controlled at 0.5-2, preferably 1-1.8.

In order to improve the castability of the molten steel for thin strip continuous casting, oxygen (O) is an essential element to form an oxide inclusion in the steel. Since it's necessary to form the low-melting-point MnO—$SiO_2$—$Al_2O_3$ ternary inclusion according to the present disclosure, the free oxygen $[O]_{Free}$ in the molten steel is required to be in the range of 0.0005-0.005%.

In order to improve the castability of the molten steel for thin strip continuous casting, among the above components, Mn and S must be controlled to satisfy the following relationship: Mn/S≥250.

After the cast strip comes out of the crystallization rolls, the temperature of the cast strip is 1420-1480° C., and it directly enters the lower closed chamber. The lower closed chamber is introduced with non-oxidizing gas, and the lower closed chamber protects the cast strip from oxidation until the strip reaches the entrance of the rolling mill. The temperature of the cast strip at the outlet of the lower closed chamber is 1150-1300° C.

In the case of adding B, the theoretical basis for precipitation of the BN phase in the cast strip occurring in the lower closing process:

The thermodynamic equations between boron and nitrogen, and between aluminum and nitrogen in γ-Fe in steel are as follows:

$$BN=B+N;\ Log\ [B][N]=-13970/T+5.24 \quad (1)$$

$$AlN=Al+N;\ Log\ [Al][N]=-6770/T+1.03 \quad (2)$$

As shown by FIG. 5, the temperature at which BN begins to precipitate in the steel is around 1280° C., and the precipitation of BN levels off at 980° C., while the precipitation of AlN has just begun (the temperature at which AlN begins to precipitate is around 980° C.). The precipitation of BN precedes that of AlN thermodynamically. According to the present disclosure, the combination of B and N is completed in a lower closed chamber to generate coarse BN particles. This inhibits precipitation of fine AlN, and thus weakens the pinning effect of fine AlN on the grain boundary, so that the growth ability of grains is improved, and austenite grains are coarsened. As a result, the austenite grains are more uniform, which is beneficial to effectively reduce the yield ratio of the product and improve the properties of the product. In addition, the combination of B and N can effectively prevent appearance of the low-melting-point phase $B_2O_3$ at the grain boundary.

The strip steel after the on-line hot rolling is post-rolling cooled. Particularly, the strip steel is cooled by gas atomization cooling. The gas atomization cooling process can effectively reduce the thickness of the oxide scale on the strip steel surface, improve the temperature uniformity of the strip steel, and promote the surface quality of the strip steel. The gas atomization cooling utilizes a gas-water ratio of 15:1-10:1, a gas pressure of 0.5-0.8 MPa, and a water pressure of 1.0-1.5 MPa. After gas atomization, a high-pressure water mist is formed and sprayed on the surface of the steel strip. On the one hand, it plays a role in reducing the temperature of the steel strip. On the other hand, the water mist forms a dense gas film which covers the surface of the strip steel to protect the strip steel from oxidation, thereby effectively suppressing the growth of the oxide scale on the surface of the hot-rolled strip steel. With the use of this cooling process, the problems caused by traditional spraying or laminar cooling can be avoided, and the surface temperature of the strip steel can drop uniformly, so as to increase the temperature uniformity of the strip steel, and achieve the effect of homogenizing the internal microstructure. At the same time, the cooling is uniform, and the shape quality and performance stability of the strip steel can be improved. In addition, the thickness of the oxide scale on the surface of the strip steel can be reduced effectively. The cooling rate for the gas atomization cooling is in the range of 20-100° C./s.

The cooled hot-rolled strip is directly coiled into coils after cutting off the head with poor quality by cutting head shears 17. The coiling temperature of the hot-rolled strip is controlled to be 600-700° C., so that the high-temperature austenite structure after rolling is transformed into a mixed microstructure of acicular ferrite and pearlite. The coiler adopts the double coiling form, or the Carrousel coiling form, to ensure the continuous production of strip steel.

Alternatively, the steel coil produced is pickled, trimmed and flattened, and then used as a pickled-flattened coil, or the steel coil is trimmed and flattened, and then used as a finished coil.

After the above manufacturing process, the final hot-rolled steel plate/strip with sulfuric acid dew point corrosion resistance reaches a yield strength of ≥330 MPa, a tensile strength of ≥440 MPa, an elongation of ≥22%, a relative corrosion rate of ≤10% (test temperature 30° C., sulfuric acid concentration 20%, full immersion test time 24 hours); and a relative corrosion rate of ≤25% (test temperature 70° C., sulfuric acid concentration 50%, full immersion test time 24 hours). The steel of the present disclosure can be widely used in tobacco baking equipment, heat exchange elements of air preheaters in petroleum, chemical industry, electric power, metallurgy and other industries, conveying pipes and flues, stack manufacturing structural parts, boiler preheaters and economizer equipment and other product fields that require sulfuric acid dew point corrosion resistance in their use environment.

The most significant features which distinguish the present disclosure from the existing thin strip continuous casting technology include the roll diameter of the crystallization rolls and the corresponding molten steel distribution mode. The technical feature of the EUROSTRIP technology is the crystallization rolls having a large diameter of Φ1500 mm Due to the large crystallization rolls together with the large capacity of the molten pool, it's easy to distribute the molten steel, but the cost for manufacturing the crystallization rolls and the cost for operation and maintenance are high. The technical feature of the CASTRIP technology is the crystallization rolls having a small diameter of Φ500 mm Due to the small crystallization rolls together with the small capacity of the molten pool, it's very difficult to distribute the molten steel, but the cost for manufacturing the casting machine and the cost for operation and maintenance are low. In order to address the challenge of uniform distribution of molten steel in the small molten pool, CASTRIP adopts a three-stage system for dispensing and distributing molten steel (tundish+transition piece+distributor). The use of a three-stage distribution system for molten steel leads to a direct increase in the cost of refractory materials. More importantly, the three-stage distribution system for molten steel extends the flow path of the molten steel, and the temperature drop of the molten steel is also larger. In order to achieve the required temperature of the molten steel in the molten pool, the tapping temperature needs to be increased greatly. The increased tapping temperature will lead to problems such as increased steelmaking cost, increased energy consumption and shortened life of refractory materials.

The crystallization rolls according to the present disclosure preferably have a diameter of Φ800 mm A two-stage system for dispensing and distributing molten steel (tundish+distributor) is adopted. The molten steel flowing out of the distributor forms different distribution patterns along the roll surfaces and the two side surfaces, and flows in two paths without interfering with each other. Due to the use of a two-stage distribution system, in contrast to a three-stage distribution system, the cost of refractory materials is reduced greatly; and the flow path of the molten steel is shortened, so that the temperature drop of the molten steel is reduced, and the tapping temperature can be lowered. Compared with the three-stage distribution system, the tapping temperature can be lowered by 30-50° C. The decreased tapping temperature can effectively reduce the cost of steelmaking, save energy and prolong the life of refractory materials. The combined use of crystallization rolls having a preferred roll diameter of Φ800 mm and a two-stage system for dispensing and distributing molten steel according to the present disclosure not only meets the requirement of stable distribution of molten steel, but also achieves the goals of simple structure, convenient operation and low processing cost.

The main advantages of the present invention are:

1. The present disclosure utilizes thin strip continuous casting technology to produce boron (B)-containing hot-rolled steel sheet/strip with sulfuric acid dew point corrosion resistance, which has not been reported so far.

2. According to the present disclosure, complicated processes such as slab heating, multi-pass repeated hot rolling and the like are obviated. With the use of a twin-roll thin strip continuous casting+one-pass on-line hot rolling process, the production process is shorter, the efficiency is higher, and the investment cost for the production line and the production cost are reduced significantly.

3. According to the present disclosure, a good number of complicated intermediate steps in the traditional process are obviated. Compared with the traditional production process, the energy consumption and the $CO_2$ emission in the production according to the present disclosure are reduced greatly, and environment-friendly products are obtained.

4. The present disclosure adopts the thin-strip continuous casting process to produce the thin-gauge hot-rolled steel plate/strip with sulfuric acid dew point corrosion resistance, and improves the sulfuric acid dew point corrosion resistance greatly; at the same time, the cast strip itself has a relatively thin thickness, and it is hot rolled online to the desired product thickness. The thin-gauge products can be directly supplied to the market to achieve the purpose of supplying thin-gauge hot-rolled plates, which can significantly improve the cost-effectiveness of plates and strips.

5. The present disclosure uses scrap steel containing Cu and Sn as raw materials to "turn harm into benefit" for Cu and Sn in steel, and realizes the full use of existing scrap steel or low-quality inferior mineral resources (high tin ores, high copper ores), promotes the recycling of scrap steel, reduces production costs, and achieves sustainable development of the steel industry.

6. The smelting of the present disclosure adopts electric furnace steelmaking, and the raw materials for smelting can use 100% whole scrap steel in the true sense, without pre-screening, which greatly reduces the cost of raw materials; if the smelting is carried out through converter steelmaking, the scrap steel is added to the converter in an amount of 20% or more based on the raw material for smelting without pre-screening, which maximizes the proportion of steel scrap supplied to the converter and greatly reduces the smelting cost and energy consumption.

7. According to the present disclosure, with the addition of a trace amount of boron element to preferentially precipitate coarse BN particles in high-temperature austenite and inhibit precipitation of fine AlN, the pinning effect of fine AlN on the grain boundary is attenuated, and the growth ability of grains is promoted. As a result, the austenite grains are coarsened and homogenized. This is beneficial to improve the performance of the product.

8. According to the present disclosure, by using gas atomization cooling for the rolled strip steel, the problems caused by traditional spraying or laminar cooling can be avoided, and the surface temperature of the strip steel can drop uniformly, so as to increase the temperature uniformity of the strip steel, and achieve the effect of homogenizing the internal microstructure. At the same time, the cooling is uniform, and the shape quality and performance stability of the strip steel can be improved. In addition, the thickness of the oxide scale on the surface of the strip steel can be reduced effectively.

9. In the traditional process for cooling a slab, precipitation of alloy elements occurs, and re-dissolution of the alloy elements is insufficient when the slab is reheated, so that the utilization rate of the alloy elements is often reduced. In the thin strip continuous casting process according to the present disclosure, the high-temperature cast strip is hot rolled directly, and the added alloy elements mainly exist in a solid solution state. Thus, the utilization rate of the alloy elements can be increased.

10. According to the present disclosure, a Carrousel coiler is used for the coiling to effectively shorten the length of the production line. At the same time, the in-situ coiling can greatly improve the control accuracy of the coiling temperature and improve the stability of the product properties.

BRIEFLY DESCRIPTION OF THE DRAWINGS

DETAILED DESCRIPTION

The present disclosure will be further described with reference to the following examples, but these examples by no means limit the present disclosure. Any changes made by those skilled in the art in the implementation of the present disclosure under the inspiration of the present specification will fall within the protection scope of the claims in the present disclosure.

Figure 1:
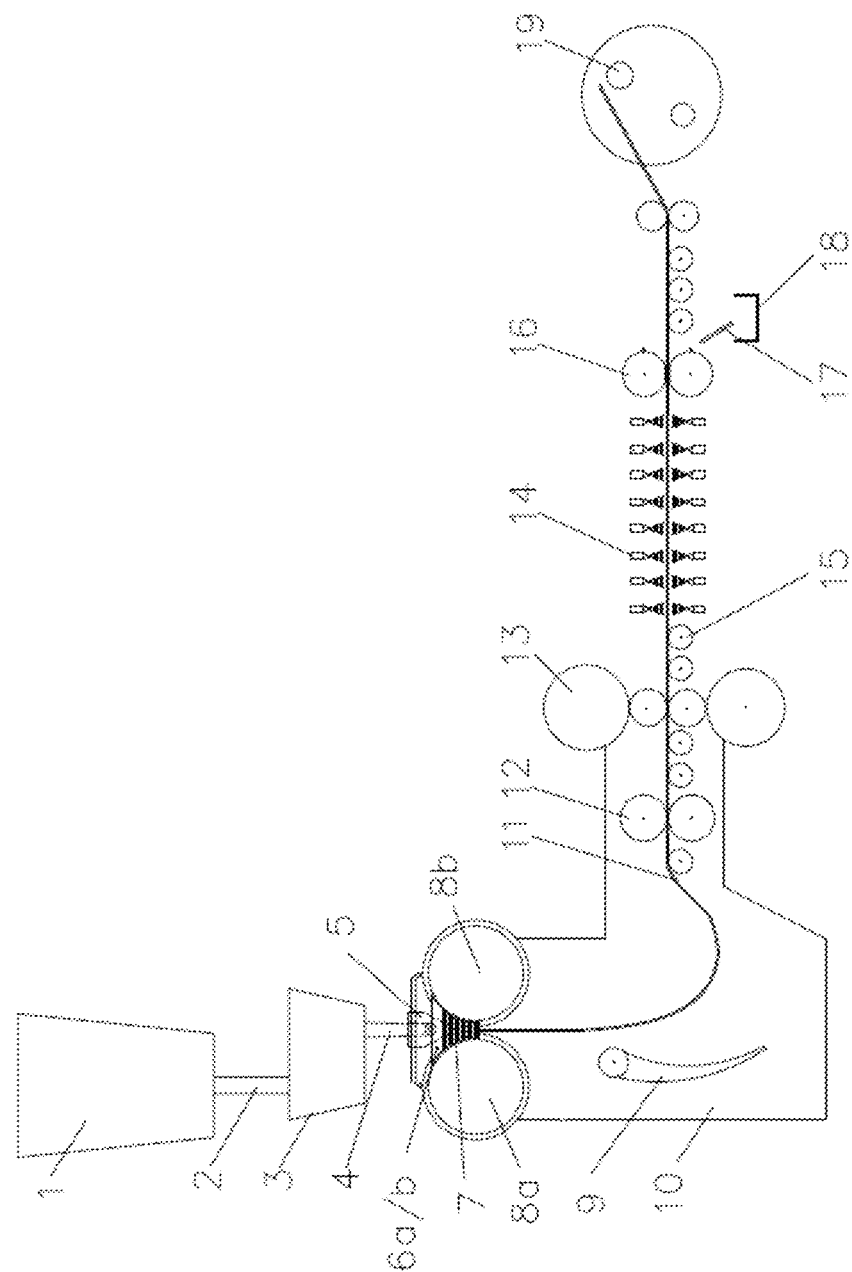
FIG. 1 is a schematic view showing the process layout of the present disclosure.
Figure 2:
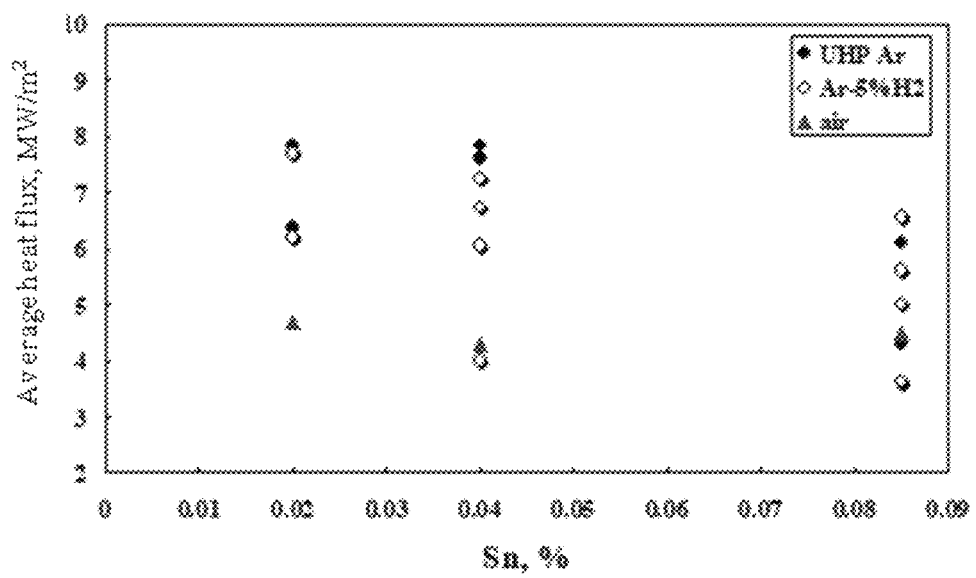
FIG. 2 is a schematic diagram showing the relationship between Sn content and average heat flux.
Figure 3:
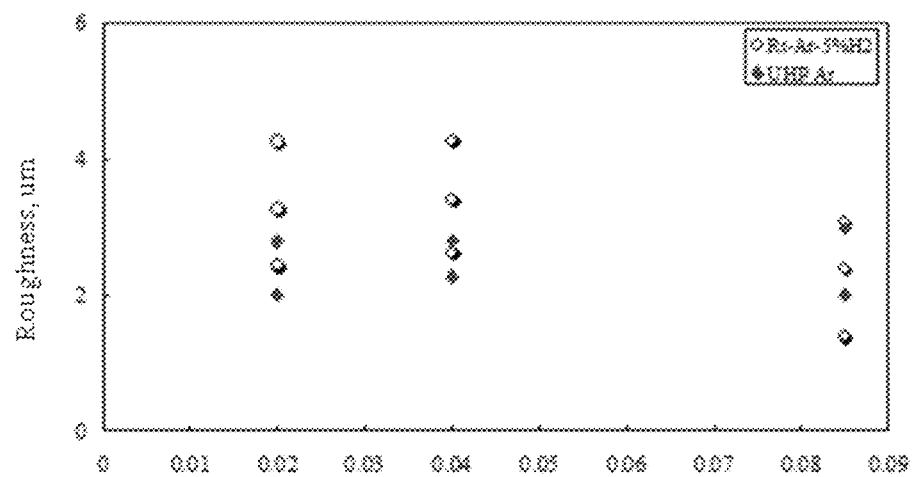
FIG. 3 is a schematic diagram showing the relationship between Sn content and cast strip surface roughness.
Figure 4:
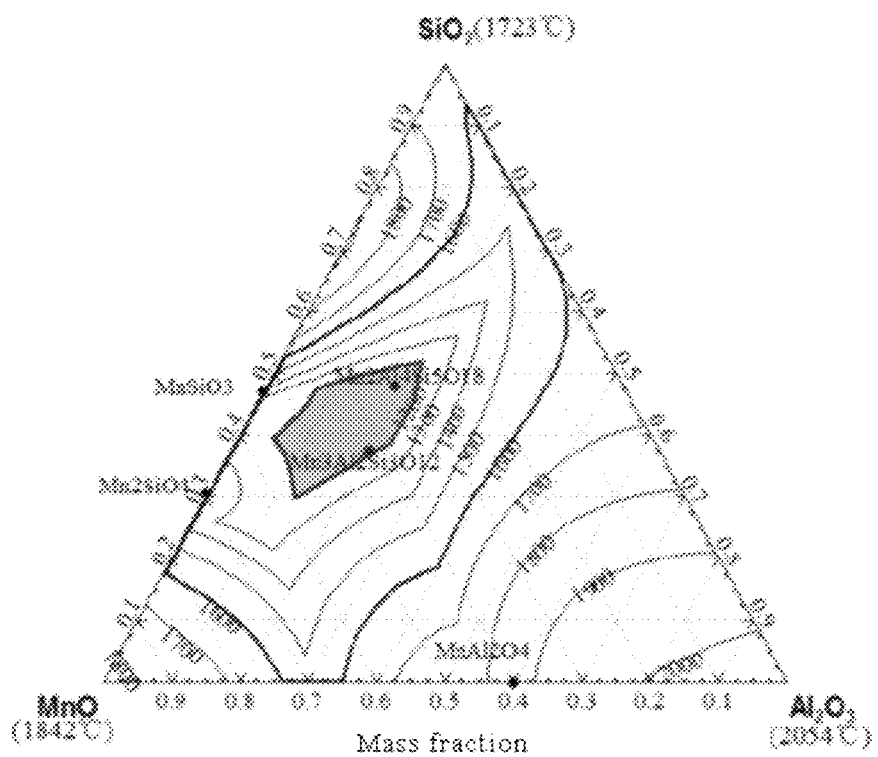
FIG. 4 is a ternary phase diagram of $MnO$—$SiO_2$—$Al_2O_3$ (shaded area: low melting point area)
Figure 5:
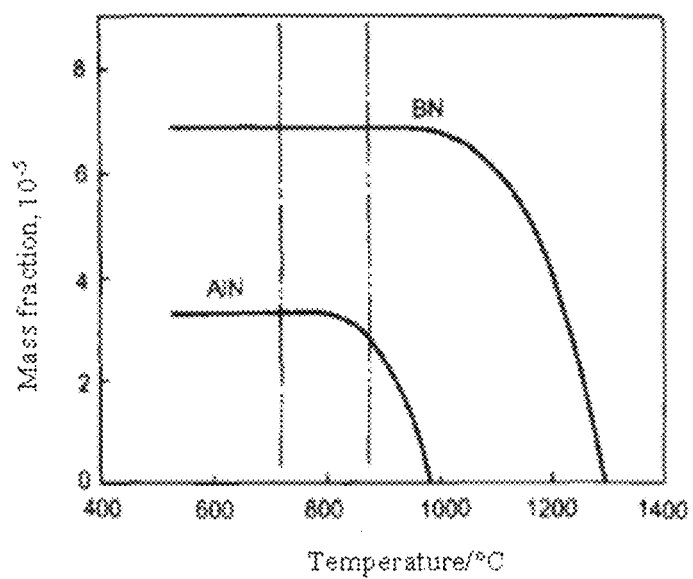
FIG. 5 is a schematic diagram showing thermodynamic precipitation curves of BN and AlN.

Referring to FIG. 1, the molten steel that conforms to the chemical composition designed according to the present disclosure passes through a ladle 1, a ladle shroud 2, a tundish 3, a submerged nozzle 4 and a distributor 5, and is then directly poured into a molten pool 7 formed with side sealing plate devices 6a, 6b and two counter-rotating crystallization rolls 8a, 8b capable of rapid cooling. The molten steel solidifies on the circumferential surfaces of the rotating crystallization rolls 8a, 8b to form a solidified shell which gradually grows, and then forms a 1.5-3 mm thick cast strip 11 at the minimum gap (nip point) between the two crystallization rolls. After the cast strip 11 exits from the crystallization rolls 8a and 8b, the temperature of the cast strip is 1420-1480° C., and the cast strip enters a lower closed chamber 10 directly. The lower closed chamber 10 is supplied with an inert gas to protect the strip steel, i.e. protecting the strip steel from oxidation. The anti-oxidation protective atmosphere may be $N_2$, or Ar, or other non-oxidizing gas, such as $CO_2$ gas obtained by sublimation of dry ice. The oxygen concentration in the lower closed chamber 10 is controlled to be <5%. The anti-oxidation protection provided by the lower closed chamber 10 to the cast strip 11 extends to the inlet of the rolling mill 13. The temperature of the cast strip at the outlet of the lower closed chamber 10 is 1150-1300° C. Then, the cast strip is delivered to the hot rolling mill 13 through a swinging guide plate 9, pinch rolls 12 and a roll table 15. After hot rolling, a hot rolled strip of 0.8-2.5 mm in thickness is formed. The rolled strip steel is cooled by gas atomization cooling with the use of a gas atomization rapid cooling device 14 to improve the temperature uniformity of the strip steel. After the head portion of the strip steel is cut off by a flying shear 16, the cut head portion falls into a flying shear pit 18 along a flying shear guide plate 17, and the hot-rolled strip with the head portion cut off enters a coiler 19 for coiling. After the steel coil is taken off the coiler, it is cooled in air to room temperature. Finally, the steel coil produced may be pickled, trimmed and flattened, and then used as a pickled-flattened coil, or the steel coil produced may be trimmed and flattened, and then used as a finished coil.

The chemical compositions of examples comprising Sn according to the present disclosure are shown in Table 1, and the balance is Fe and other unavoidable impurities. The process parameters of the manufacturing method according to the present disclosure are shown in Table 2, and the mechanical properties of the hot-rolled strips obtained finally are shown in Table 3.

The sulfuric acid corrosion resistance test was carried out on the steel products from the examples according to the standard JB/T 7901-1999: Laboratory Uniform Corrosion Full Immersion Test Method for Metal Materials. The sulfuric acid corrosion resistance test was carried out, and the relative corrosion rate of the material was measured. The test results are shown in Table 4. Test condition 1: test temperature of 30° C. and sulfuric acid concentration of 20%, the full immersion test time of 24 hours; Test condition 2: test temperature of 70° C. and sulfuric acid concentration of 50%, the full immersion test time of 24 hours. The grade of the comparative sample is Q235B.

To sum up, the hot-rolled steel plate/strip with sulfuric acid dew point corrosion resistance manufactured by thin strip continuous casting technology according to the designed range of the steel composition provided by the present disclosure has a yield strength of ≥330 MPa, a tensile strength of ≥440 MPa, an elongation of ≥22% and a qualified cold bendability. The comparison of the corrosion resistance results also shows that: the relative corrosion rate of the inventive steel is ≤10% (test temperature 30° C., sulfuric acid concentration 20 wt %, full immersion test time 24 hours); and the relative corrosion rate is ≤25% (test temperature 70° C., sulfuric acid concentration 50 wt %, full immersion test time 24 hours). The steel of the present disclosure can be widely used in tobacco baking equipment, heat exchange elements of air preheaters in petroleum, chemical industry, electric power, metallurgy and other industries, conveying pipes and flues, stack manufacturing structural parts, boiler preheaters and economizer equipment and other product fields that require sulfuric acid dew point corrosion resistance in their use environment.

TABLE 1

Chemical compositions of the steel Examples (wt. %)

| Ex. No. | C | Si | Mn | P | S | N | O | Als | Cr | Ni | Sb | Ti | Cu | Sn |
|---|---|---|---|---|---|---|---|---|---|---|---|---|---|---|
| 1 | 0.026 | 0.29 | 1.36 | 0.018 | 0.005 | 0.0074 | 0.0093 | 0.0009 | 0.72 | 0.18 | 0.08 | 0.05 | 0.38 | 0.025 |
| 2 | 0.045 | 0.10 | 0.91 | 0.023 | 0.003 | 0.0061 | 0.0110 | 0.0006 | 0.50 | 0.23 | 0.19 | 0.08 | 0.25 | 0.005 |
| 3 | 0.054 | 0.38 | 1.27 | 0.015 | 0.004 | 0.0058 | 0.0150 | 0.0004 | 1.03 | 0.30 | 0.25 | 0.13 | 0.20 | 0.034 |
| 4 | 0.020 | 0.25 | 1.10 | 0.013 | 0.004 | 0.0087 | 0.0130 | 0.0008 | 1.13 | 0.16 | 0.04 | 0.03 | 0.38 | 0.040 |
| 5 | 0.023 | 0.44 | 0.65 | 0.009 | 0.002 | 0.0052 | 0.0120 | 0.0007 | 1.20 | 0.27 | 0.28 | 0.09 | 0.44 | 0.016 |
| 6 | 0.032 | 0.43 | 0.67 | 0.022 | 0.002 | 0.0046 | 0.0070 | 0.0008 | 0.92 | 0.10 | 0.13 | 0.08 | 0.53 | 0.037 |
| 7 | 0.041 | 0.18 | 0.85 | 0.015 | 0.003 | 0.0040 | 0.0100 | 0.0005 | 0.70 | 0.26 | 0.30 | 0.15 | 0.27 | 0.033 |
| 8 | 0.048 | 0.52 | 1.00 | 0.014 | 0.004 | 0.0100 | 0.0085 | 0.0006 | 0.82 | 0.17 | 0.26 | 0.04 | 0.60 | 0.014 |
| 9 | 0.036 | 0.33 | 0.85 | 0.018 | 0.003 | 0.0078 | 0.0200 | 0.0003 | 1.06 | 0.14 | 0.24 | 0.14 | 0.45 | 0.028 |
| 10 | 0.060 | 0.44 | 0.40 | 0.030 | 0.001 | 0.0055 | 0.0125 | 0.0004 | 1.15 | 0.29 | 0.15 | 0.06 | 0.52 | 0.015 |
| 11 | 0.057 | 0.55 | 0.66 | 0.010 | 0.002 | 0.0090 | 0.0090 | 0.0005 | 0.95 | 0.13 | 0.22 | 0.14 | 0.48 | 0.007 |
| 12 | 0.035 | 0.29 | 1.50 | 0.012 | 0.006 | 0.0085 | 0.0118 | 0.0003 | 0.87 | 0.24 | 0.09 | 0.12 | 0.35 | 0.013 |
| 13 | 0.048 | 0.47 | 1.27 | 0.008 | 0.004 | 0.0045 | 0.0132 | 0.0006 | 0.64 | 0.19 | 0.15 | 0.06 | 0.45 | 0.036 |
| 14 | 0.024 | 0.25 | 1.42 | 0.017 | 0.003 | 0.0064 | 0.0075 | 0.0005 | 0.78 | 0.28 | 0.26 | 0.07 | 0.27 | 0.008 |

TABLE 2

Process parameters of the Examples

| Ex. No. | Cast strip thickness mm | Atmosphere in lower closed chamber | Oxygen concentration in lower closed chamber % | Hot rolling temperature, °C. | Hot rolling reduction rate, % | Hot-rolled strip thickness mm | Post-rolling cooling rate, °C./s | Coiling temperature, °C. |
|---|---|---|---|---|---|---|---|---|
| 1 | 1.90 | $N_2$ | 3.5 | 1180 | 29 | 1.35 | 35 | 690 |
| 2 | 2.20 | Ar | 4.2 | 1220 | 25 | 1.65 | 30 | 600 |
| 3 | 2.00 | $N_2$ | 2.5 | 1200 | 35 | 1.30 | 30 | 660 |
| 4 | 2.10 | $CO_2$ | 2.7 | 1150 | 29 | 1.50 | 20 | 650 |
| 5 | 2.40 | Ar | 3.5 | 1185 | 50 | 1.20 | 32 | 680 |
| 6 | 2.40 | Ar | 2.8 | 1100 | 23 | 1.85 | 72 | 670 |
| 7 | 2.30 | $N_2$ | 1.5 | 1190 | 22 | 1.80 | 65 | 680 |
| 8 | 2.00 | $CO_2$ | 0.8 | 1220 | 38 | 1.25 | 100 | 690 |
| 9 | 2.70 | $N_2$ | 1.5 | 1250 | 26 | 2.00 | 22 | 670 |
| 10 | 2.00 | $N_2$ | 1.9 | 1170 | 30 | 1.40 | 75 | 700 |
| 11 | 2.10 | Ar | 1.8 | 1240 | 29 | 1.50 | 30 | 675 |
| 12 | 2.10 | $N_2$ | 2.6 | 1170 | 24 | 1.60 | 60 | 685 |
| 13 | 2.20 | $CO_2$ | 2.4 | 1180 | 23 | 1.70 | 30 | 690 |
| 14 | 2.20 | Ar | 2.5 | 1160 | 25 | 1.65 | 25 | 680 |

TABLE 3

Mechanical properties of the steel products in the Examples

| Ex. No. | Cast strip thickness mm | Final product thickness mm | Yield strength MPa | Tensile strength MPa | Elongation % | 180° bend diameter d = 3a |
|---|---|---|---|---|---|---|
| 1 | 1.90 | 1.35 | 338 | 455 | 23 | Pass |
| 2 | 2.20 | 1.65 | 342 | 463 | 23 | Pass |
| 3 | 2.00 | 1.30 | 351 | 455 | 25 | Pass |
| 4 | 2.10 | 1.50 | 348 | 462 | 22 | Pass |
| 5 | 2.40 | 1.20 | 362 | 465 | 26 | Pass |
| 6 | 2.40 | 1.85 | 346 | 458 | 25 | Pass |
| 7 | 2.30 | 1.80 | 349 | 466 | 26 | Pass |
| 8 | 2.00 | 1.25 | 347 | 458 | 28 | Pass |
| 9 | 2.70 | 2.00 | 356 | 475 | 27 | Pass |
| 10 | 2.00 | 1.40 | 365 | 457 | 25 | Pass |
| 11 | 2.10 | 1.50 | 359 | 464 | 23 | Pass |
| 12 | 2.10 | 1.60 | 348 | 454 | 24 | Pass |
| 13 | 2.20 | 1.70 | 358 | 468 | 23 | Pass |
| 14 | 2.20 | 1.65 | 355 | 474 | 25 | Pass |

TABLE 4

Test results of the sulfuric acid corrosion resistance
of the steel products in the Examples

| Test conditions | Relative corrosion rate, % | |
|---|---|---|
| | test temperature: 30° C., sulfuric acid concentration: 20%, full immersion test time: 24 hours | test temperature: 70° C., sulfuric acid concentration: 50%, full immersion test time: 24 hours |
| Q235B | 100 | 100 |
| Ex. 1 | 9.64 | 24.65 |
| Ex. 2 | 9.72 | 23.48 |
| Ex. 3 | 8.88 | 22.54 |
| Ex. 4 | 8.74 | 23.73 |
| Ex. 5 | 8.85 | 23.68 |
| Ex. 6 | 8.87 | 22.75 |
| Ex. 7 | 9.66 | 23.73 |
| Ex. 8 | 9.58 | 22.72 |
| Ex. 9 | 9.55 | 24.58 |
| Ex. 10 | 9.39 | 23.73 |
| Ex. 11 | 8.63 | 23.76 |
| Ex. 12 | 9.32 | 23.58 |
| Ex. 13 | 9.42 | 22.28 |
| Ex. 14 | 9.68 | 24.76 |

The chemical compositions of Examples comprising B according to the present disclosure are shown in Table 5, and the balance is Fe and other unavoidable impurities. The process parameters of the manufacturing method according to the present disclosure are shown in Table 6, and the mechanical properties of the hot-rolled strips obtained finally are shown in Table 7.

The sulfuric acid corrosion resistance test was carried out on the steel products from the examples according to the standard JB/T 7901-1999: Laboratory Uniform Corrosion Full Immersion Test Method for Metal Materials. The sulfuric acid corrosion resistance test was carried out, and the relative corrosion rate of the material was measured. The test results are shown in Table 8. Test condition 1: test temperature of 30° C. and sulfuric acid concentration of 20%, the full immersion test time of 24 hours; test condition 2: test temperature of 70° C. and sulfuric acid concentration of 50%, the full immersion test time of 24 hours. The grade of the comparative sample is Q235B.

To sum up, the B-containing hot-rolled steel plate/strip with sulfuric acid dew point corrosion resistance manufactured by thin strip continuous casting technology according to the designed range of the steel composition provided by the present disclosure has a yield strength of ≥330 MPa, a tensile strength of ≥440 MPa, an elongation of ≥22% and a qualified cold bendability. The comparison of the corrosion resistance results also shows that: the relative corrosion rate of the inventive steel is ≤10% (test temperature 30° C., sulfuric acid concentration 20 wt %, full immersion test time 24 hours); and the relative corrosion rate is ≤25% (test temperature 70° C., sulfuric acid concentration 50 wt %, full immersion test time 24 hours). The steel of the present disclosure can be widely used in tobacco baking equipment, heat exchange elements of air preheaters in petroleum, chemical industry, electric power, metallurgy and other industries, conveying pipes and flues, stack manufacturing structural parts, boiler preheaters and economizer equipment and other product fields that require sulfuric acid dew point corrosion resistance in their use environment.

TABLE 5

Chemical compositions of the steel Examples (wt. %)

| Ex. No. | C | Si | Mn | P | S | N | O | Als | Cr | Ni | Sb | Ti | Cu | B |
|---|---|---|---|---|---|---|---|---|---|---|---|---|---|---|
| 15 | 0.027 | 0.27 | 1.36 | 0.018 | 0.005 | 0.0074 | 0.0093 | 0.0009 | 0.73 | 0.17 | 0.07 | 0.05 | 0.37 | 0.004 |
| 16 | 0.045 | 0.10 | 0.91 | 0.023 | 0.003 | 0.0061 | 0.0110 | 0.0006 | 0.50 | 0.25 | 0.18 | 0.08 | 0.24 | 0.001 |
| 17 | 0.054 | 0.36 | 1.27 | 0.015 | 0.004 | 0.0058 | 0.0150 | 0.0004 | 1.01 | 0.30 | 0.29 | 0.13 | 0.20 | 0.003 |
| 18 | 0.020 | 0.25 | 1.16 | 0.013 | 0.004 | 0.0087 | 0.0130 | 0.0008 | 1.12 | 0.16 | 0.04 | 0.03 | 0.32 | 0.005 |
| 19 | 0.023 | 0.44 | 0.65 | 0.009 | 0.002 | 0.0052 | 0.0120 | 0.0007 | 1.20 | 0.28 | 0.27 | 0.09 | 0.45 | 0.006 |
| 20 | 0.032 | 0.43 | 0.64 | 0.022 | 0.002 | 0.0046 | 0.0070 | 0.0008 | 0.93 | 0.10 | 0.18 | 0.08 | 0.53 | 0.004 |
| 21 | 0.041 | 0.19 | 0.83 | 0.015 | 0.003 | 0.0040 | 0.0100 | 0.0005 | 0.74 | 0.25 | 0.30 | 0.15 | 0.27 | 0.003 |
| 22 | 0.049 | 0.52 | 1.02 | 0.014 | 0.004 | 0.0100 | 0.0085 | 0.0006 | 0.84 | 0.17 | 0.25 | 0.04 | 0.60 | 0.002 |
| 23 | 0.038 | 0.31 | 0.81 | 0.018 | 0.003 | 0.0078 | 0.0200 | 0.0003 | 1.07 | 0.14 | 0.24 | 0.14 | 0.46 | 0.003 |
| 24 | 0.060 | 0.49 | 0.40 | 0.030 | 0.001 | 0.0055 | 0.0125 | 0.0004 | 1.18 | 0.26 | 0.13 | 0.06 | 0.53 | 0.004 |
| 25 | 0.057 | 0.55 | 0.66 | 0.010 | 0.002 | 0.0090 | 0.0090 | 0.0005 | 0.97 | 0.15 | 0.22 | 0.14 | 0.49 | 0.005 |
| 26 | 0.036 | 0.28 | 1.50 | 0.012 | 0.006 | 0.0085 | 0.0118 | 0.0003 | 0.88 | 0.27 | 0.09 | 0.12 | 0.37 | 0.002 |
| 27 | 0.045 | 0.47 | 1.38 | 0.008 | 0.004 | 0.0045 | 0.0132 | 0.0006 | 0.66 | 0.18 | 0.11 | 0.06 | 0.45 | 0.004 |
| 28 | 0.024 | 0.26 | 1.40 | 0.017 | 0.003 | 0.0064 | 0.0075 | 0.0005 | 0.78 | 0.29 | 0.26 | 0.07 | 0.28 | 0.003 |

TABLE 6

Process parameters of the Examples

| Ex. No. | Cast strip thickness mm | Atmosphere in lower closed chamber | Oxygen concentration in lower closed chamber % | Hot rolling temperature ° C. | Hot rolling reduction rate, % | Hot-rolled strip thickness, mm | Post-rolling cooling rate, ° C./s | Coiling temperature ° C. |
|---|---|---|---|---|---|---|---|---|
| 15 | 1.90 | $N_2$ | 3.5 | 1180 | 29 | 1.35 | 35 | 690 |
| 16 | 2.20 | Ar | 4.2 | 1220 | 27 | 1.60 | 30 | 600 |
| 17 | 2.00 | $N_2$ | 2.5 | 1200 | 33 | 1.35 | 30 | 660 |
| 18 | 2.10 | $N_2$ | 2.7 | 1150 | 26 | 1.55 | 20 | 650 |
| 19 | 2.40 | Ar | 3.5 | 1185 | 50 | 1.20 | 32 | 680 |
| 20 | 2.40 | Ar | 2.8 | 1100 | 23 | 1.85 | 72 | 670 |
| 21 | 2.30 | $N_2$ | 1.5 | 1190 | 22 | 1.80 | 65 | 680 |

TABLE 6-continued

Process parameters of the Examples

| Ex. No. | Cast strip thickness mm | Atmosphere in lower closed chamber | Oxygen concentration in lower closed chamber % | Hot rolling temperature °C | Hot rolling reduction rate, % | Hot-rolled strip thickness, mm | Post-rolling cooling rate, °C./s | Coiling temperature °C |
|---|---|---|---|---|---|---|---|---|
| 22 | 2.00 | $N_2$ | 0.8 | 1220 | 33 | 1.35 | 100 | 690 |
| 23 | 2.70 | $N_2$ | 1.5 | 1250 | 26 | 2.00 | 22 | 670 |
| 24 | 2.00 | $N_2$ | 1.9 | 1170 | 28 | 1.45 | 75 | 700 |
| 25 | 2.10 | Ar | 1.8 | 1240 | 26 | 1.55 | 30 | 675 |
| 26 | 2.10 | $N_2$ | 2.6 | 1170 | 24 | 1.60 | 60 | 685 |
| 27 | 2.20 | $N_2$ | 2.4 | 1180 | 25 | 1.65 | 30 | 690 |
| 28 | 2.20 | Ar | 2.5 | 1160 | 23 | 1.70 | 25 | 680 |

TABLE 7

Mechanical properties of the steel products in the Examples

| Ex. No. | Cast strip thickness mm | Final product thickness mm | Yield strength MPa | Tensile strength MPa | Elongation % | 180° bend diameter d = 3a |
|---|---|---|---|---|---|---|
| 15 | 1.90 | 1.35 | 338 | 460 | 25 | Pass |
| 16 | 2.20 | 1.60 | 346 | 465 | 24 | Pass |
| 17 | 2.00 | 1.35 | 344 | 458 | 24 | Pass |
| 18 | 2.10 | 1.55 | 338 | 462 | 22 | Pass |
| 19 | 2.40 | 1.20 | 350 | 463 | 28 | Pass |
| 20 | 2.40 | 1.85 | 347 | 448 | 26 | Pass |
| 21 | 2.30 | 1.80 | 344 | 465 | 28 | Pass |
| 22 | 2.00 | 1.35 | 335 | 455 | 29 | Pass |
| 23 | 2.70 | 2.00 | 350 | 473 | 27 | Pass |
| 24 | 2.00 | 1.45 | 364 | 458 | 25 | Pass |
| 25 | 2.10 | 1.55 | 357 | 464 | 24 | Pass |
| 26 | 2.10 | 1.60 | 343 | 450 | 25 | Pass |
| 27 | 2.20 | 1.65 | 356 | 466 | 23 | Pass |
| 28 | 2.20 | 1.70 | 348 | 465 | 28 | Pass |

TABLE 8

Test results of the sulfuric acid corrosion resistance of the steel products in the Examples

| Test conditions | Relative corrosion rate, % | |
|---|---|---|
| | test temperature: 30° C., sulfuric acid concentration: 20%, full immersion test time 24 hours | test temperature: 70° C., sulfuric acid concentration: 50%, full immersion test time: 24 hours |
| Q235B | 100 | 100 |
| Ex. 15 | 9.46 | 24.38 |
| Ex. 16 | 9.34 | 23.59 |
| Ex. 17 | 8.37 | 21.57 |
| Ex. 18 | 9.79 | 23.64 |
| Ex. 19 | 8.86 | 23.79 |
| Ex. 20 | 8.75 | 20.58 |
| Ex. 21 | 9.58 | 23.76 |
| Ex. 22 | 9.49 | 22.83 |
| Ex. 23 | 9.58 | 24.55 |
| Ex. 24 | 9.39 | 23.66 |
| Ex. 25 | 8.68 | 23.84 |
| Ex. 26 | 9.43 | 23.55 |
| Ex. 27 | 9.69 | 23.25 |
| Ex. 28 | 9.86 | 24.67 |

The chemical compositions of Examples according to the present disclosure are shown in Table 9, and the balance is Fe and other unavoidable impurities. The process parameters of the manufacturing method according to the present disclosure are shown in Table 10, and the mechanical properties of the hot-rolled strips obtained finally are shown in Table 11.

The sulfuric acid corrosion resistance test was carried out on the steel products from the examples according to the standard JB/T 7901-1999: Laboratory Uniform Corrosion Full Immersion Test Method for Metal Materials. The sulfuric acid corrosion resistance test was carried out, and the relative corrosion rate of the material was measured. The test results are shown in Table 12. Test condition 1: test temperature of 30° C. and sulfuric acid concentration of 20%, the full immersion test time of 24 hours; test condition 2: test temperature of 70° C. and sulfuric acid concentration of 50%, the full immersion test time of 24 hours. The grade of the comparative sample is Q235B.

The data in Table 11 show that the thin-gauge hot-rolled steel plate/strip with sulfuric acid dew point corrosion resistance manufactured by thin strip continuous casting technology according to the designed range of the steel composition provided by the present disclosure has a yield strength of ≥330 MPa, a tensile strength of ≥440 MPa, an elongation of ≥22% and a qualified cold bendability.

The comparison of the corrosion resistance results in Table 12 also shows that: the relative corrosion rate of the inventive steel is ≤10% (test temperature 30° C., sulfuric acid concentration 20 wt %, full immersion test time 24 hours); and the relative corrosion rate is ≤25% (test temperature 70° C., sulfuric acid concentration 50 wt %, full immersion test time 24 hours). The steel of the present disclosure can be widely used in tobacco baking equipment, heat exchange elements of air preheaters in petroleum, chemical industry, electric power, metallurgy and other industries, conveying pipes and flues, stack manufacturing structural parts, boiler preheaters and economizer equipment and other product fields that require sulfuric acid dew point corrosion resistance in their use environment.

TABLE 9

Chemical compositions of the steel Examples (wt. %)

| Ex. No. | C | Si | Mn | P | S | N | O | Als | Cr | Ni | Sb | Ti | Cu | Sn | B |
|---|---|---|---|---|---|---|---|---|---|---|---|---|---|---|---|
| 29 | 0.025 | 0.25 | 1.35 | 0.018 | 0.005 | 0.0074 | 0.0096 | 0.0009 | 0.72 | 0.18 | 0.08 | 0.05 | 0.38 | 0.026 | 0.003 |
| 30 | 0.046 | 0.10 | 0.90 | 0.023 | 0.003 | 0.0061 | 0.0110 | 0.0006 | 0.50 | 0.23 | 0.19 | 0.08 | 0.25 | 0.005 | 0.001 |
| 31 | 0.058 | 0.38 | 1.28 | 0.015 | 0.004 | 0.0058 | 0.0150 | 0.0004 | 1.03 | 0.30 | 0.25 | 0.13 | 0.20 | 0.033 | 0.004 |
| 32 | 0.020 | 0.26 | 1.10 | 0.013 | 0.004 | 0.0087 | 0.0130 | 0.0008 | 1.13 | 0.16 | 0.04 | 0.03 | 0.38 | 0.040 | 0.006 |
| 33 | 0.022 | 0.47 | 0.65 | 0.009 | 0.002 | 0.0052 | 0.0120 | 0.0007 | 1.20 | 0.27 | 0.28 | 0.09 | 0.44 | 0.014 | 0.003 |
| 34 | 0.037 | 0.43 | 0.67 | 0.022 | 0.002 | 0.0046 | 0.0070 | 0.0008 | 0.92 | 0.10 | 0.13 | 0.08 | 0.53 | 0.038 | 0.005 |
| 35 | 0.045 | 0.19 | 0.85 | 0.015 | 0.003 | 0.0040 | 0.0100 | 0.0005 | 0.70 | 0.26 | 0.30 | 0.15 | 0.27 | 0.035 | 0.003 |
| 36 | 0.048 | 0.51 | 1.00 | 0.014 | 0.004 | 0.0100 | 0.0085 | 0.0006 | 0.82 | 0.17 | 0.26 | 0.04 | 0.60 | 0.015 | 0.002 |
| 37 | 0.036 | 0.35 | 0.84 | 0.018 | 0.003 | 0.0078 | 0.0200 | 0.0003 | 1.06 | 0.14 | 0.24 | 0.14 | 0.45 | 0.027 | 0.004 |
| 38 | 0.060 | 0.45 | 0.40 | 0.030 | 0.001 | 0.0055 | 0.0125 | 0.0004 | 1.15 | 0.29 | 0.15 | 0.06 | 0.52 | 0.016 | 0.006 |
| 39 | 0.057 | 0.55 | 0.65 | 0.010 | 0.002 | 0.0090 | 0.0090 | 0.0005 | 0.95 | 0.13 | 0.22 | 0.14 | 0.48 | 0.008 | 0.003 |
| 40 | 0.033 | 0.27 | 1.50 | 0.012 | 0.006 | 0.0085 | 0.0118 | 0.0003 | 0.87 | 0.24 | 0.09 | 0.12 | 0.35 | 0.012 | 0.002 |
| 41 | 0.049 | 0.48 | 1.37 | 0.008 | 0.004 | 0.0045 | 0.0132 | 0.0006 | 0.64 | 0.19 | 0.15 | 0.06 | 0.45 | 0.038 | 0.005 |
| 42 | 0.025 | 0.23 | 1.40 | 0.017 | 0.003 | 0.0064 | 0.0075 | 0.0005 | 0.78 | 0.28 | 0.26 | 0.07 | 0.27 | 0.007 | 0.004 |

TABLE 10

Process parameters of the Examples

| Ex. No. | Cast strip thickness mm | Atmosphere in lower closed chamber | Oxygen concentration in lower closed chamber % | Hot rolling temperature ° C. | Hot rolling reduction rate, % | Hot-rolled strip thickness, mm | Post-rolling cooling rate, ° C./s | Coiling temperature ° C. |
|---|---|---|---|---|---|---|---|---|
| 29 | 1.90 | $N_2$ | 3.5 | 1180 | 29 | 1.35 | 35 | 690 |
| 30 | 2.20 | Ar | 4.2 | 1220 | 25 | 1.65 | 30 | 600 |
| 31 | 2.00 | $N_2$ | 2.5 | 1200 | 35 | 1.30 | 30 | 660 |
| 32 | 2.10 | $CO_2$ | 2.7 | 1150 | 29 | 1.50 | 20 | 650 |
| 33 | 2.40 | Ar | 3.5 | 1185 | 50 | 1.20 | 32 | 680 |
| 34 | 2.40 | Ar | 2.8 | 1100 | 23 | 1.85 | 72 | 670 |
| 35 | 2.30 | $N_2$ | 1.5 | 1190 | 22 | 1.80 | 65 | 680 |
| 36 | 2.00 | $CO_2$ | 0.8 | 1220 | 38 | 1.25 | 100 | 690 |
| 37 | 2.70 | $N_2$ | 1.5 | 1250 | 26 | 2.00 | 22 | 670 |
| 38 | 2.00 | $N_2$ | 1.9 | 1170 | 30 | 1.40 | 75 | 700 |
| 39 | 2.10 | Ar | 1.8 | 1240 | 29 | 1.50 | 30 | 675 |
| 40 | 2.10 | $N_2$ | 2.6 | 1170 | 24 | 1.60 | 60 | 685 |
| 41 | 2.20 | $CO_2$ | 2.4 | 1180 | 23 | 1.70 | 30 | 690 |
| 42 | 2.20 | Ar | 2.5 | 1160 | 25 | 1.65 | 25 | 680 |

TABLE 11

Mechanical properties of the steel products in the Examples

| Ex. No. | Cast strip thickness mm | Final product thickness mm | Yield strength MPa | Tensile strength MPa | Elongation % | 180° bend diameter d = 3a (a = strip thickness) |
|---|---|---|---|---|---|---|
| 29 | 1.90 | 1.35 | 335 | 450 | 24 | Pass |
| 30 | 2.20 | 1.65 | 341 | 460 | 23 | Pass |
| 31 | 2.00 | 1.30 | 350 | 445 | 24 | Pass |
| 32 | 2.10 | 1.50 | 338 | 452 | 22 | Pass |
| 33 | 2.40 | 1.20 | 360 | 463 | 27 | Pass |
| 34 | 2.40 | 1.85 | 347 | 448 | 26 | Pass |
| 35 | 2.30 | 1.80 | 344 | 465 | 28 | Pass |
| 36 | 2.00 | 1.25 | 335 | 455 | 28 | Pass |
| 37 | 2.70 | 2.00 | 350 | 473 | 27 | Pass |
| 38 | 2.00 | 1.40 | 364 | 458 | 25 | Pass |
| 39 | 2.10 | 1.50 | 357 | 464 | 23 | Pass |
| 40 | 2.10 | 1.60 | 346 | 450 | 25 | Pass |
| 41 | 2.20 | 1.70 | 356 | 466 | 23 | Pass |
| 42 | 2.20 | 1.65 | 358 | 477 | 26 | Pass |

TABLE 12

Test results of the sulfuric acid corrosion resistance
of the steel products in the Examples

| Test conditions | Relative corrosion rate, % | |
|---|---|---|
| | test temperature: 30° C., sulfuric acid concentration: 20%, full immersion test time: 24 hours | test temperature: 70° C., sulfuric acid concentration: 50%, full immersion test time: 24 hours |
| Q235B | 100 | 100 |
| Ex. 29 | 9.60 | 24.45 |
| Ex. 30 | 9.62 | 23.68 |
| Ex. 31 | 8.38 | 21.54 |
| Ex. 32 | 8.79 | 23.43 |
| Ex. 33 | 8.83 | 23.38 |
| Ex. 34 | 8.89 | 20.65 |
| Ex. 35 | 9.56 | 23.83 |
| Ex. 36 | 9.56 | 22.32 |
| Ex. 37 | 9.52 | 24.56 |
| Ex. 38 | 9.19 | 23.43 |
| Ex. 39 | 8.60 | 23.78 |
| Ex. 40 | 9.42 | 23.52 |
| Ex. 41 | 9.62 | 23.28 |
| Ex. 42 | 9.87 | 24.36 |

What is claimed is:

1. A hot-rolled steel plate/strip with sulfuric acid dew point corrosion resistance, comprising the following chemical elements in weight percentages: C: 0.02-0.06%, Si: 0.10-0.55%, Mn: ≤1.5%, P≤0.03%, S≤0.007%, Ti: 0.03-0.15%, Cr: 0.50-1.20%, Ni: 0.10-0.30%, Sb: 0.04-0.30%, Cu: 0.20-0.60%, N: 0.004-0.010%, Als: <0.001%, one or both of Sn: 0.005-0.04% and B: 0.001-0.006%, Mn/S≥250, total oxygen $[O]_T$: 0.007-0.020%; and a balance of Fe and other unavoidable impurities; wherein a microstructure of the hot-rolled steel plate/strip is a mixed microstructure of acicular ferrite+pearlite; wherein the hot-rolled steel plate/strip has a yield strength of ≥330 MPa, a tensile strength of ≥440 MPa, and an elongation of ≥22%; and wherein the hot-rolled steel plate/strip with sulfuric acid dew point corrosion resistance has a relative corrosion rate of ≤10% tested at 30° C., 20% concentrated sulfuric acid for 24 hours, and/or a relative corrosion rate of ≤25% tested at 70° C., 50% concentrated sulfuric acid for 24 hours.

2. The hot-rolled steel plate/strip with sulfuric acid dew point corrosion resistance according to claim 1, wherein the hot-rolled steel plate/strip has a yield strength of 330-370 MPa, a tensile strength of 440-480 MPa, and an elongation of 22-30%.

3. The hot-rolled steel plate/strip with sulfuric acid dew point corrosion resistance according to claim 1, wherein the hot-rolled steel plate/strip with sulfuric acid dew point corrosion resistance has a thickness of 0.8-2.5 mm.

4. The hot-rolled steel plate/strip with sulfuric acid dew point corrosion resistance according to claim 3, wherein the hot-rolled steel plate/strip with sulfuric acid dew point corrosion resistance has a thickness of 1.2-2.0 mm.

5. The hot-rolled steel plate/strip with sulfuric acid dew point corrosion resistance according to claim 1, wherein the hot-rolled steel plate/strip with sulfuric acid dew point corrosion resistance comprises the following chemical elements in weight percentages: C: 0.02-0.06%, Si: 0.10-0.55%, Mn: ≤1.5%, P≤0.03%, S≤0.007%, Ti: 0.03-0.15%, Cr: 0.50-1.20%, Ni: 0.10-0.30%, Sb: 0.04-0.30%, Cu: 0.20-0.60%, N: 0.004-0.010%, Als: <0.001%, Sn: 0.005-0.04%, Mn/S>250, total oxygen $[O]_T$: 0.007-0.020%; and a balance of Fe and other unavoidable impurities.

6. The hot-rolled steel plate/strip with sulfuric acid dew point corrosion resistance according to claim 1, wherein the hot-rolled steel plate/strip with sulfuric acid dew point corrosion resistance comprises the following chemical elements in weight percentages: C: 0.02-0.06%, Si: 0.10-0.55%, Mn: ≤1.5%, P≤0.03%, S≤0.007%, Ti: 0.03-0.15%, Cr: 0.50-1.20%, Ni: 0.10-0.30%, Sb: 0.04-0.30%, Cu: 0.20-0.60%, N: 0.004-0.010%, Als: <0.001%, B: 0.001-0.006%, Mn/S>250, total oxygen $[O]_T$: 0.007-0.020%; and a balance of Fe and other unavoidable impurities.

7. A manufacturing method for the hot-rolled steel plate/strip with sulfuric acid dew point corrosion resistance according to claim 1 -comprising the following steps:

1) Smelting
   wherein smelting is performed on the composition according to claim 1; wherein a basicity a=CaO/SiO$_2$ for slagging in a steelmaking process is controlled at a<1.5; wherein a MnO/SiO$_2$ ratio in molten steel for producing a low-melting-point MnO—SiO$_2$—Al$_2$O$_3$ ternary inclusion is controlled at 0.5-2; wherein a free oxygen content $[O]_{Free}$ in the molten steel is 0.0005-0.005%; and wherein in the molten steel, Mn/S≥250;

2) Continuous casting
   wherein twin-roll thin strip continuous casting is used, wherein a 1.5-3 mm thick cast strip is formed at the smallest gap between two crystallization rolls; wherein the crystallization rolls have a diameter of 500-1500 mm, wherein water is supplied to an inside of the crystallization rolls for cooling; wherein a casting machine has a casting speed of 60-150 m/min; wherein a two-stage system for dispensing and distributing molten steel is used for molten steel delivery in the continuous casting, i.e., a tundish+a distributor;

3) Lower closed chamber protection
   wherein after a cast strip exits from the crystallization rolls, the cast strip has a temperature of 1420-1480° C., and it enters a lower closed chamber directly, wherein a non-oxidizing gas is supplied to the lower closed chamber, wherein an oxygen concentration in the lower closed chamber is controlled at <5%; and wherein the cast strip has a temperature of 1150-1300° C. at an outlet of the lower closed chamber;

4) On-line hot rolling
   wherein the cast strip is delivered through pinch rolls in the lower closed chamber to a rolling mill, and rolled into a rolled steel strip having a thickness of 0.8-2.5 mm at a rolling temperature of 1100-1250° C. and a hot rolling reduction rate controlled at 30-50%, wherein the steel strip after the hot rolling has a thickness of 1.2-2.0 mm;

5) Post-rolling cooling
   wherein the steel strip after the on-line hot rolling is post-rolling cooled, wherein the steel strip is cooled by gas atomization cooling, wherein a cooling rate of the gas atomization cooling is 20-100° C./s; and 6) Coiling
   wherein the hot-rolled steel strip is coiled into a steel coil after the cooling, wherein a coiling temperature is 600-700° C.

8. The manufacturing method for the hot-rolled steel plate/strip with sulfuric acid dew point corrosion resistance according to claim 7, wherein the method further comprises step 7): follow-up treatment, wherein the steel coil is pickled, trimmed and flattened, and then used as a pickled-flattened coil, or the steel coil is trimmed and flattened, and then used as a finished coil.

9. The manufacturing method for the hot-rolled steel plate/strip with sulfuric acid dew point corrosion resistance according to claim 7, wherein in step 1), electric furnace steelmaking or converter steelmaking is employed for the smelting to obtain molten steel; and then the molten steel enters an LF furnace, a VD/VOD furnace, or an RH furnace for refining.

10. The manufacturing method for the hot-rolled steel plate/strip with sulfuric acid dew point corrosion resistance according to claim 7, wherein in step 3), the non-oxidizing gas includes $N_2$, Ar, or $CO_2$ gas produced by sublimation of dry ice.

11. The manufacturing method for the hot-rolled steel plate/strip with sulfuric acid dew point corrosion resistance according to claim 7, wherein in step 5), the gas atomization cooling utilizes a gas-water flow ratio of 15:1-10:1, a gas pressure of 0.5-0.8 MPa, and a water pressure of 1.0-1.5 MPa, and the unit of the flow is $m^3/h$.

12. The manufacturing method for the hot-rolled steel plate/strip with sulfuric acid dew point corrosion resistance according to claim 7, wherein in step 6), the coiling utilizes double-coiler coiling or Carrousel coiling.

13. The manufacturing method for the hot-rolled steel plate/strip with sulfuric acid dew point corrosion resistance according to claim 7, wherein the hot-rolled steel plate/strip with sulfuric acid dew point corrosion resistance comprises Sn; in step 1), an electric furnace is used for smelting to produce molten steel, wherein 100% steel scrap is selected as the raw material for smelting without pre-screening; alternatively, a converter is used for smelting to produce molten steel, wherein steel scrap is added to the converter in an amount of 20% or more based on the raw material for smelting without pre-screening; and then, the molten steel enters an LF furnace, a VD/VOD furnace or an RH furnace for refining.

14. The manufacturing method for the hot-rolled steel plate/strip with sulfuric acid dew point corrosion resistance according to claim 7, wherein:
the basicity $a=CaO/SiO_2$ for slagging in a steelmaking process is controlled at $a<1.2$, or $a=0.7-1.0$; and/or
the $MnO/SiO_2$ ratio in molten steel for producing a low-melting-point $MnO$—$SiO_2$—$Al_2O_3$ ternary inclusion is controlled at 1-1.8; and/or
the crystallization rolls have a diameter of 800 mm.

15. The manufacturing method for the hot-rolled steel plate/strip with sulfuric acid dew point corrosion resistance according to claim 7, wherein the hot-rolled steel plate/strip with sulfuric acid dew point corrosion resistance comprises the following chemical elements in weight percentages: C: 0.02-0.06%, Si: 0.10-0.55%, Mn: ≤1.5%, P≤0.03%, S≤0.007%, Ti: 0.03-0.15%, Cr: 0.50-1.20%, Ni: 0.10-0.30%, Sb: 0.04-0.30%, Cu: 0.20-0.60% N: 0.004-0.010%, Als: <0.001%, Sn: 0.005-0.04%, Mn/S>250, total oxygen $[O]_T$: 0.007-0.020%; and a balance of Fe and other unavoidable impurities.

16. The manufacturing method for the hot-rolled steel plate/strip with sulfuric acid dew point corrosion resistance according to claim 7, wherein the hot-rolled steel plate/strip with sulfuric acid dew point corrosion resistance comprises the following chemical elements in weight percentages: C: 0.02-0.06%, Si: 0.10-0.55%, Mn: ≤1.5%, P≤0.03%, S≤0.007%, Ti: 0.03-0.15%, Cr: 0.50-1.20%, Ni: 0.10-0.30%, Sb: 0.04-0.30%, Cu: 0.20-0.60% N: 0.004-0.010%, Als: <0.001%, B: 0.001-0.006%, Mn/S>250, total oxygen $[O]_T$: 0.007-0.020%; and a balance of Fe and other unavoidable impurities.

\* \* \* \* \*